United States Patent

Santucci

[15] 3,637,177
[45] Jan. 25, 1972

[54] SUPPORT STRUCTURE

[72] Inventor: Kenneth E. Santucci, 9 N. Circle Ave., Boomingdale, Ill. 60108

[22] Filed: Jan. 19, 1970

[21] Appl. No.: 3,817

Related U.S. Application Data

[63] Continuation-in-part of Ser. No. 748,004, July 26, 1968, abandoned.

[52] U.S. Cl. ................................248/74 PB, 248/350
[51] Int. Cl. ..............................................F16l 3/08
[58] Field of Search ..............248/73.7, 16 PB, 73 S, 73 AP, 248/73 SH, 73 PB; 24/73.7, 16 PB, 73 SHP, 73 SH PB

[56] References Cited

UNITED STATES PATENTS

| | | | |
|---|---|---|---|
| 1,269,901 | 6/1918 | Burke | 248/97 X |
| 2,371,861 | 3/1945 | Weir | 248/188.1 X |
| 2,385,296 | 9/1945 | Moore | 248/304 |
| 2,548,586 | 4/1951 | Bruner | 108/150 |
| 3,239,178 | 3/1966 | Pompa | 248/205 A |

FOREIGN PATENTS OR APPLICATIONS

| | | | |
|---|---|---|---|
| 1,123,839 | 6/1956 | France | 248/74 PB |
| 1,022,820 | 3/1966 | Great Britain | 248/74 PB |

Primary Examiner—Chancellor E. Harris
Attorney—Petherbridge, O'Neill and Lindgren

[57] ABSTRACT

A unitary device designed to be secured to a substructure and to support and retain an object, such as a cable or the replaceable spindle for converting a standard record player spindle to accommodate records with odd-sized openings, for example, 45 r.p.m. record spindle openings. The supporting structure or device is designed to utilize a contact adhesive to bond or secure the device to a substructure and to utilize the structural features of the device to minimize the effects of deflection or jarring of the object retaining portion of the unit. Deflection forces would normally have a tendency to lift a formerly bonded edge of the device from the substructure with the ultimate result of a gradual but total dislodgement of the device from the substructure.

9 Claims, 6 Drawing Figures

PATENTED JAN 25 1972
3,637,177
SHEET 1 OF 2
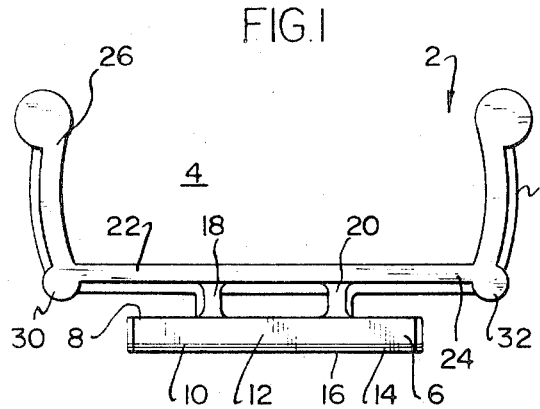
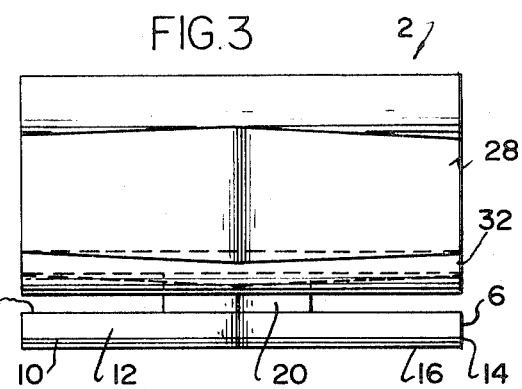
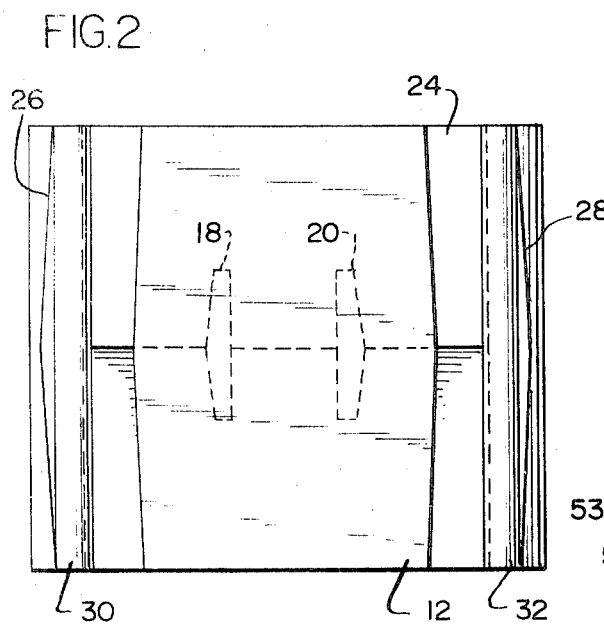
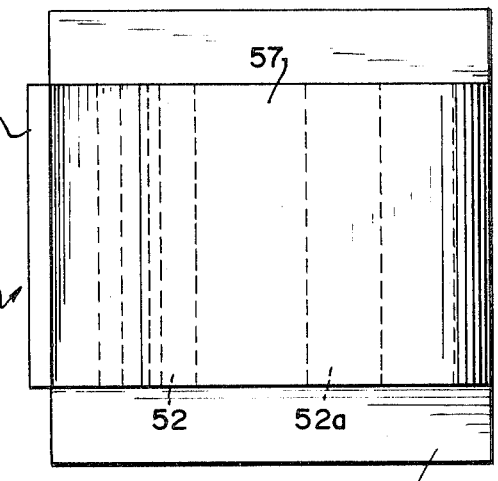
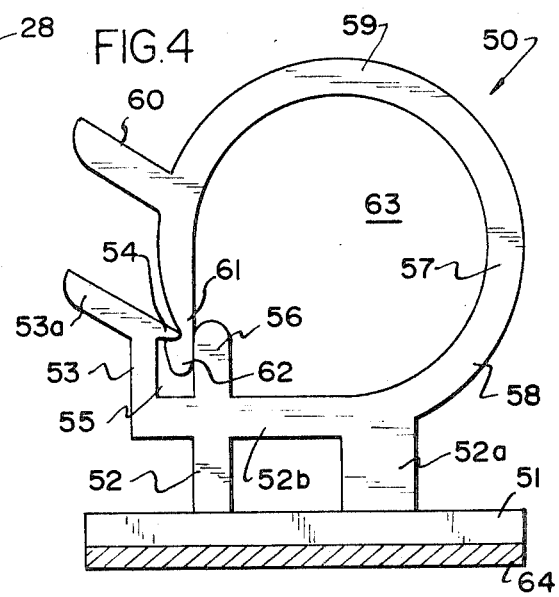
INVENTOR.
KENNETH E. SANTUCCI
BY Petherbridge, O'Neill & Aubel
ATTORNEYS.

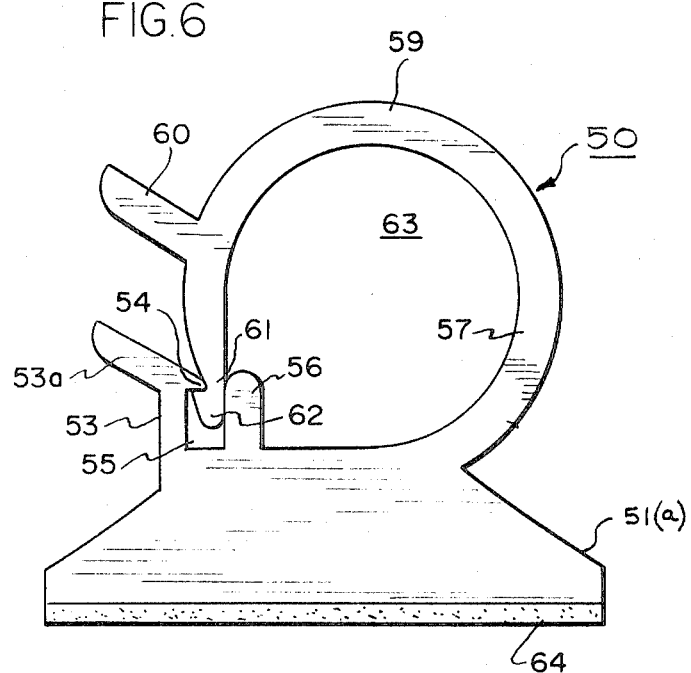

SUPPORT STRUCTURE

This application is a continuation-in-part of Kenneth E. Santucci application Ser. No. 748,004, filed July 26, 1968, now abandoned.

The unitary supporting structure or device of the invention has been designed to fulfill a need for a connector element which can be easily and economically employed in various applications to attach an object which might be removably secured to the connector, to a substructure and wherein securement of the connector to the substructure can be accomplished, utilizing one of the relatively commonly available adhesives. Specific use for the support structure of the invention include: Provision of a base element to permit the removable attachment of a spindle device, such as is used in connection with record players to convert the permanent spindle thereof to accommodate records with varying spindle openings such as are found in 45 r.p.m. records; and a locking cable clamp element.

The problem which has most frequently faced people utilizing the adhesive securement of such connectors to a substructure, particularly wherein the retaining means of the device is necessarily of a large size to accommodate a spindle or other object being removably retained, has developed from the eventual dislodgment of the connector by bumping, jarring or rough treatment following securement to a substructure. In such instances, the retainer portion of the connector device may be deflected by an accidental force in a manner such that an edge of the base of the connector is raised from the substructure by the torque produced by the deflection of the retainer portion of the connector, which portion is normally of a larger size than the supporting base portion thereof. As an initial separation of contact adhesive and substructure is produced, the bond therebetween is essentially permanently broken and the connector over a period of time will ultimately be fully dislodged from the substructure.

The support structure or connector device of the invention has been designed to overcome such disadvantages. Since the device is preferably made of a commonly available plastic material, it can be fabricated utilizing a high-speed and economical injection molding process although it is possible to produce acceptable devices through extrusion and machining; however, this adds somewhat to the unit cost of production of such a device.

The connector device of the invention is ordinarily fabricated as an integral or unitary one-piece structure. One such structure includes a generally flat base. An adhesive is applied to the lower surface of this base and a protective coating, such as paraffin treated paper, is applied over the adhesive in a manner which will permit it to be readily removed without affecting the adhesive.

To avoid the problems attendant in the lifting of base edges by the deflection or jarring of the retainer portion of the connector device, a pair of substantially centrally located upstanding leg members project from the base to the generally enlarged object supporting and retaining portion of the device. The upstanding legs project from the base of the device in an area of the base which is spaced a substantial distance inwardly from the peripheral base edges. This area therefore is essentially in the center portion of the base. The integrally formed support and retainer member is normally formed with a substantially larger lateral area than the base and overlies the upstanding legs and the base portion of the unit. In this manner, the base portion and upstanding legs of the support device or structure can almost be entirely hidden or obscured from view in most applications of the connector device.

With this construction, when the support and retaining portion of the device is deflected by bumping pushing or twisting, as might occur in the hurried removal of a spindle retained thereby, the deflection or twist forces are directed from the support and retaining portion of the connector device to the upstanding legs thereof which will, in turn, transmit this force to the central portion of the base where it can be absorbed over substantially the entire adhesive bonded area of the base.

Normal construction of such support structures would involve connecting the retainer portion of the device directly to the base thereof or, at best, connecting the retainer portion through leg elements to the peripheral edges of the base whereby all deflection and twist forces are transmitted directly to the adhesive portions located adjacent the peripheral base edges. Even small forces, so directed, can be of a magnitude sufficient to produce a separation between the adhesive of the base and the substructure to which it is bonded breaking the bond, such a break will ultimately be increased in magnitude until the connector element is dislodged entirely from the substructure.

Various other objects and advantages of the invention will hereinafter become more fully apparent from the following description of the drawings illustrating presently preferred embodiments thereof and wherein:

FIG. 1 is a front elevation of the support structure of the invention illustrating a spindle in phantom;

FIG. 2 is a top plan view of the support structure of the invention;

FIG. 3 is a side elevation of the support structure;

FIG. 4 is a side elevation of an alternate embodiment of the support structure of the invention;

FIG. 5 is a top plan view of the embodiment illustrated in FIG. 4.

FIG. 6 is a side elevation of the structure of FIGS. 4 and 5 having an alternate base.

Referring now to the drawings, FIG. 1 illustrates a connector device or support structure, generally designated 2, removably supporting and retaining a spindle adapter device 4 illustrated in phantom. This adapter device, per se, forms no part of the support structure of the invention.

The connector device or support structure of the invention is formed with a base portion 6 having generally flat parallel top and bottom surfaces 8 and 10, respectively, and essentially continuous peripheral edge surfaces 12 connecting these top and bottom surfaces. As is shown in FIG. 2, the base portion 6 of the connector device of the invention is formed with a generally rectangular configuration.

To provide a means for readily securing base portion 6 to a suitable substructure, a contract adhesive or resinous material 14 is applied to the bottom generally rectangular surface 10 of the base portion of the support structure 2. This adhesive is preferably of a character such that the exertion of pressure upon the body of the base portion 6 against a supporting substructure will effect the securement of the connector device 2 to the substructure. Good results have been obtained in utilizing either a vinyl or polyurethane closed-cell foam carrying a transparent, long-aging, high-tack adhesive manufactured by Minnesota Mining and Manufacturing Company under the trade designation of "Scotch-Mount" brand double-coated foam tape with DS-4 adhesive formulation.

The connector device carrying the adhesive or resin on the base 6 thereof can be taken from stock and pressed firmly against a substructure suitable for mounting. This will serve to produce a sufficient curing of the resin or contact adhesive 14 to effect the essentially permanent securement of the base portion 6 and thereby the support structure to a preselected substructure.

In order to protect the resin or contact adhesive from a premature bonding, curing or contamination, a protective sheet or strip 16, as can be best seen in FIGS. 1 and 3, is applied over the resin or contact adhesive coating 14 on the base portion 6 of the support structure. This protective strip will serve to keep dust, dirt, grease and other materials from contacting the exposed adhesive in a manner which could adversely affect the curing or bonding efficiency of the resin or adhesive 14 when the connector device or support structure 2 is mounted upon the selected substructure. The strip or sheet 16 is ordinarily fabricated from a paraffin or plastic impregnated paper, or plastic sheet which will readily adhere to the exposed adhesive. The composition of the strip 16 is such that it will not react in the presence of the uncured adhesive to produce any kind of permanent bond or curing between the strip 16 and the adhesive 14. The strip also has the property of being readily removable from the adhesive while carrying essentially no adhesive residue with it when it is removed thereby leaving the adhesive or resin material in a substantially undisturbed condition.

As is shown in FIGS. 1, 2 and 3, a pair of spaced upstanding legs 18 and 20 project upwardly from top surface 8 of base portion 6 and in generally parallel alignment with each other. The drawings show that the legs 18 and 20 project from top surface 8 of the base portion of the connector device from an area of this surface which is spaced substantially inwardly from the continuous rectangular peripheral edges 12 thereof. The legs have a rectangular appearance in side elevation, but flare outwardly at both the top and bottom portions thereof for additional support and force distribution.

A support or retainer portion 22 of the connector device 2 is provided on the top ends of legs 18 and 20 and overlies the legs 18 and 20 as shown in the drawings. The support or retainer portion 22 includes a horizontal portion 24 which serves as the primary support for the spindle adapter carried thereby. As can be seen in FIGS. 1 and 2, the horizontal portion 24 of the retainer portion 22 is made to fully overlie both legs 18 and 20 and to substantially overlie the entire base portion 6. While this is a preferred structural relationship in the connector device of the invention, the support or retainer portion 22 may not necessarily overlie the entire base portion 6 in all applications.

As can be best seen in FIG. 1, the support or retainer portion 22 is provided with a pair of spaced generally vertically extending leg elements 26 and 28, respectively. These leg elements extend from the peripheral extremities of the horizontal portion 24 of the retainer portion and project in a generally normal relationship with respect thereto. The leg elements 26 and 28 extend in parallel relationship along substantially the entire lateral edges 30 and 32, respectively. The construction of the support or retainer portion 22 therefor is capable of supporting an object substantially larger than base portion 6, such as a spindle adapter, and retaining the object in its supported position.

The connector device or support structure 2 of the invention is preferably fabricated from a plastic material as a unitary or integrally formed structure. The material used, preferably provides a degree of resiliency sufficient to permit an object such as a spindle adapter 4 to be firmly but removably retained by the retainer member in a manner such that the spindle adapter 4 can be readily and repeatedly withdrawn from and replaced on the connector device or support structure 2.

The structure of the connector device 2 of the invention has been arranged in a manner such that deflection or twist forces applied to the enlarged support or retainer portion 22 of the structure can be distributed through the legs 18 and 20 to essentially the central portion of the base of the device wherein the forces can be absorbed while minimizing the dislodgment tendencies of such forces. Therefore, when the leg elements 26 and 28 and horizontal portion 24 of the support portion 22 of the device are pushed, pulled, twisted or deflected in almost any manner, the force exerted upon the retainer portion is transmitted to the legs 18 and 20 of the connector device 2 which, in turn, transmit and distribute the force to the central portion of the base 6 for absorption across the broadest possible area. This acts to distribute such forces through the entire base portion 6 rather than producing force concentrations along the peripheral edge 12 of the base portion in a manner which would cause edge lifting. Such edge lifting forces can now be minimized with the structure of the invention. Minimizing the edge lifting forces is important in preserving the integrity of the adhesive or resin bond produced by the contact adhesive 14 applied to the base. The construction greatly enhances the permanence of the bond between the connector device and a substructure and makes possible the reliable use of adhesively connected plastic parts in a multitude of applications.

The drawings of FIGS. 4 and 5 illustrate a modified embodiment of the support structure of the invention. FIGS. 4 and 5 show a cable clamp generally designated 50. The clamp 50 includes a flat, generally horizontal base 51 which, in this instance, is provided with a pair of generally vertically extending legs 52 and 52a to support the body 52b of the cable clamp. The base 51, as shown in FIG. 5, is formed with an enlarged cross section to minimize deflection effects when the body 52b is subjected to strain. This substantially enhances clamp adherence to a substructure by preventing the undesired lifting of the bottom surface of the clamp from a subsurface to which it is adhesively secured. The clamp 50 of FIGS. 4 and 5 is provided with a first leg 53, which projects generally vertically from the body 52b and is provided with an integrally formed generally horizontally extending lever 53a. The upper extremity of this first leg 53 is provided with a downwardly extending hooklike projection 54 which is designed to serve as a first locking means. Spaced slightly from the first leg and separated therefrom by a channel 55 is a second generally vertically projecting leg 56. This leg serves to cooperate with the first leg and the hooklike projection 54 thereof to produce and maintain a positive lock.

The clamp of FIGS. 4 and 5 is also formed with a third leg generally designated 57. This leg includes a lower first portion 58 which projects from the body 52b generally vertically upwardly therefrom and in parallel relationship with legs 53 and 56. The third leg 57 includes a second portion 59 which comprises a continuous extension of the first lower leg portion 58 and is disposed in a generally arcuate configuration with respect to the base 51. Leg 57 also includes a lever operator 60 which acts cooperably with lever 53a to facilitate closure of the clamp. The extremity of the third leg 57 is constricted at 61 below which the leg is provided with a locking hook 62 which has a portion extending back over the constricted portion 61 of the leg 57. After one or more cables have been inserted in through the originally open enclosure 63 formed by the body 52b and the legs 53 and 57, the lever 60 is depressed forcing the exterior complementing inclined surfaces of hooklike projection 54 and locking hook 62 to slide over one another until the locking hook 62 at the extremity of third leg 57 enters channel 55 between first leg 53 and second leg 56. Upon release of the lever operator 60, leg 57 is permitted to resiliently respond to the release by permitting the locking hook to rise in channel 55 guided by second leg 56 into locking engagement with hooklike projection 54 of first leg 53. The enclosure 63 is now complete.

Through the assistance of second leg 56, the accidental dislodgment of the locking elements through the bumping or jarring of the clamp is prevented. The second leg 56 will effectively resist movement in the direction of the longitudinal axis of the base. This clamp therefore provides a positive lock between the legs forming the enclosure 63 and provides a reliable cable clamp. If it is desired to open the clamp by releasing locking hook 62 from engagement with locking projection 54, lever 53a is depressed to open channel 55 and permit the release of the lock by raising lever 60.

Cable clamp 50, therefore, provides a device which can permanently lock one or more cable elements in a predetermined position. The base 51 is treated with an adhesive 64 similar to 14 used in connection with the embodiment of FIGS. 1 through 3. When the clamp 50 is adhesively bonded to a supporting substructure, the resulting installation is firm and highly resistant to accidental dislodgment by twisting, bumping, jarring, etc.

Referring now to FIG. 6, there is shown the clamp 50 having a modified base 51. In this alternative embodiment, like reference numerals indicate elements corresponding to the embodiment hereintofore described with reference to FIGS. 4 and 5. The base 51 has been modified to eliminate any column effect which might be noticed in certain types of applications of the previously disclosed embodiments and to minimize localized torsion effects on the support structure.

The clamp 50 includes a base 51(a) having a leg 53, which projects generally vertically from the base 51(a) and is provided with an integrally formed generally horizontally extending lever 53(a). The upper extremity of this leg 53 is provided with a downwardly extending hooklike projection 54 which is designed to serve as a first locking means. Spaced slightly from the leg and separated therefrom by channel 55 is another generally vertically projecting leg or guide 56. This leg serves to cooperate with the leg 53 and the hooklike projection 54 to produce and maintain a positive lock.

Another leg, generally designated 57, is formed as a depending extension from the base 51(a). The leg 57 is formed of a material having a flexibility such that the leg may be bent back upon itself in the manner illustrated in FIG. 6 without material failure. Various such elastomeric materials known to those skilled in the art may be utilized fro such purposes. The leg 57 extends generally vertically upward from the base member 51(a) and is disposed in a general arcuate configuration with respect to the base. A lever 60 is formed from the leg 57 and acts cooperably with lever 53(a) to facilitate opening and closing the clamp 50. The extremity or terminal portion of the leg 57 is constricted at 61 to form a locking hook 62 which has a portion extending outwardly and back over the constricted portion 61 of the leg 57. In operation, the lever 60 is depressed forcing exterior complementing inclined surfaced of hooklike projection 54 and locking hook 62 to slide over one another until the locking hook 62 at the extremity of leg 57 enters a channel 55 formed between the leg 53 and leg 56. The resiliency of the leg 57 biases the leg outwardly such that the locking hook 62 rises in channel 55 and is secured into locking engagement with hooklike projection 54 of leg 53. The enclosure 63 so formed is now complete.

The leg 57 is maintained in its lock position precluding accidental dislodgment of the locking elements by means of the cooperation between the leg 56 and the hooklike portion 54. The leg or guide 56 will effectively resist movement of leg 57 in an inward direction, thereby, forming a positive lock of the locking portions. When it is desired to open the clamp, lever 53(a) is depressed to open channel 55 releasing locking hook 62 from engagement with locking projection 54 and allowing the release of the lock by releasing lever 60.

Various modes of carrying out the invention are contemplated as being within the scope of the following claims particularly pointing out and distinctly claiming the subject matter which is regarded as the invention.

I claim:

1. An adhesively mounted support structure comprising:
   a base member having a surface for adhesively bonding the support structure to a substructure,
   an upstanding means projecting from a surface of the base member disposed opposite that for adhesive bonding,
   a support member provided on an end of the upstanding means and spaced from the base member,
   said support member overlying the upstanding member and at least a portion of the base member,
   the support member includes a substantially greater surface area than the base member,
   the base member has a generally flat surface for adhesively bonding the support structure to a substructure,
   said upstanding means including a pair of upstanding members projecting in generally parallel spaced relationship from the surface of the base member opposite the flat surface thereof,
   the pair of upstanding members projecting from a predetermined area of the base member spaced inwardly of the peripheral end thereof,
   the support members are provided on the end of the upstanding members opposite the base member and in an overlying relationship with respect thereto, and
   the pair of upstanding members having flared ends adjacent the support member and the base member.

2. The support structure of claim 1 wherein the adhesive bonding surface of the base member is provided with a contact adhesive surface to permit adhesive securement of the support structure to a substructure and removable means are applied over the adhesive surface to protect the contact adhesive from contamination and accidental securement prior to application and adhesive securement of the support structure to a substructure.

3. An adhesively mounted support structure comprising:
   a base member having a surface on a first portion for adhesively bonding the support structure to a substructure,
   said base member carrying a depending first leg portion on a second portion thereof and extending outwardly therefrom and doubled back over a portion of said base member,
   said second portion of said base member carrying a second dependent leg portion extending outwardly therefrom and forming a locking portion at a point removed from said base member,
   said first leg having a complementary locking portion formed at substantially the terminal point thereof, engageable with said locking portion of said second leg to form an enclosed loop,
   said first and second portion of the base member being interconnected by a pair of upstanding members projecting in generally parallel spaced relationship from the surface of the first portion opposite the flat surface thereof,
   the first and second portions are provided on the ends of the upstanding members in an overlying relationship with respect thereto, and
   one of the pair of upstanding members having a greater cross-sectional area than the other of the pair of upstanding members.

4. The support structure of claim 3 wherein said first and second legs each include means cooperatively actuable with each other to release said respective locking portions from engagement.

5. The support structure of claim 3 wherein said base member includes guide means extending therefrom in spaced relationship with said second leg to form a channel therebetween for receiving and retaining the locking portion of said first leg therein.

6. An adhesively mounted support structure for retaining a cable segment in a preselected position comprising:
   a base member having a surface for adhesively bonding the support structure to a substructure,
   an upstanding member projecting from a surface of the base member disposed opposite that for adhesive bonding,
   a support member provided on an end of the upstanding member and spaced from the base member,
   said support member overlying the upstanding member and at least a portion of the base member,
   a first leg formed integrally with the support member including a first portion projecting therefrom,
   the first leg being doubled back over the support member including a second major portion thereof spaced from the support member,
   the first leg being provided with a first locking means on the second portion thereof,
   a second leg being formed integrally with the support member including a portion projecting from the support member in a direction generally parallel to the first portion of the first leg,
   the second leg being provided with a second locking means engageable with and cooperable with the first locking means on the second portion of the first leg to lock the legs together and to provide a cable clamp closure between the support member and the first and second legs, and
   the support member includes guide means extending therefrom in spaced relationship with said second leg to form a channel therebetween for receiving and retaining the locking means of said first leg therein.

7. An adhesively mounted support structure comprising:
   a base member having a surface for adhesively bonding the support structure to a substructure,
   an upstanding member projecting from a surface of the base member disposed opposite that for adhesive bonding, a support member provided on an end of the upstanding member and spaced from the base member, said support member overlying the upstanding member in at least a portion of the base member, the base member has a generally flat surface for adhesively bonding the support structure to a substructure, a pair of upstanding members projecting in generally parallel spaced relationship from the surface of the base member opposite the surface thereof, the pair of upstanding members projected from a predetermined area of the base member spaced inwardly of the peripheral ends thereof, the support members are provided on the ends of the upstanding members opposite the base member in an overlying relationship with respect thereto, the surface of the base member opposite the flat surface is positioned in generally parallel alignment therewith, the upstanding members are integrally formed with the base member and project therefrom in a generally normal relationship with respect to the parallel base surfaces, the predetermined area of the base member from which the pair of upstanding members project is disposed substantially midway between the peripheral edges defining the base member to direct the deflecting forces applied to the pair of upstanding members to the predetermined area of the base member and away from the peripheral area of the base member, the support member is integrally formed on the ends of the upstanding members opposite the base member and in overlying relationship with respect thereto, the surface of the support member in contact with the upstanding members being disposed in parallel and overlying relationship with respect to the parallel surfaces of the base member, and retaining means on the support member for supporting an object.

8. The support structure of claim 7 wherein the flat adhesive bonding surface of the base member is provided with a contact adhesive surface and removable means are applied to the adhesive surface to protect the contact adhesive from contamination and unintentional contact bonding.

9. The support structure of claim 3 wherein the retaining means on the support member comprise a pair of generally upstanding retainer members projecting from the support member for supporting and retaining an object in a predetermined position.

* * * * *